T. P. FOLEY.
SHIPPING CRATE FOR BANANAS.
APPLICATION FILED JAN. 15, 1914.
1,116,259.
Patented Nov. 3, 1914.
2 SHEETS—SHEET 2.
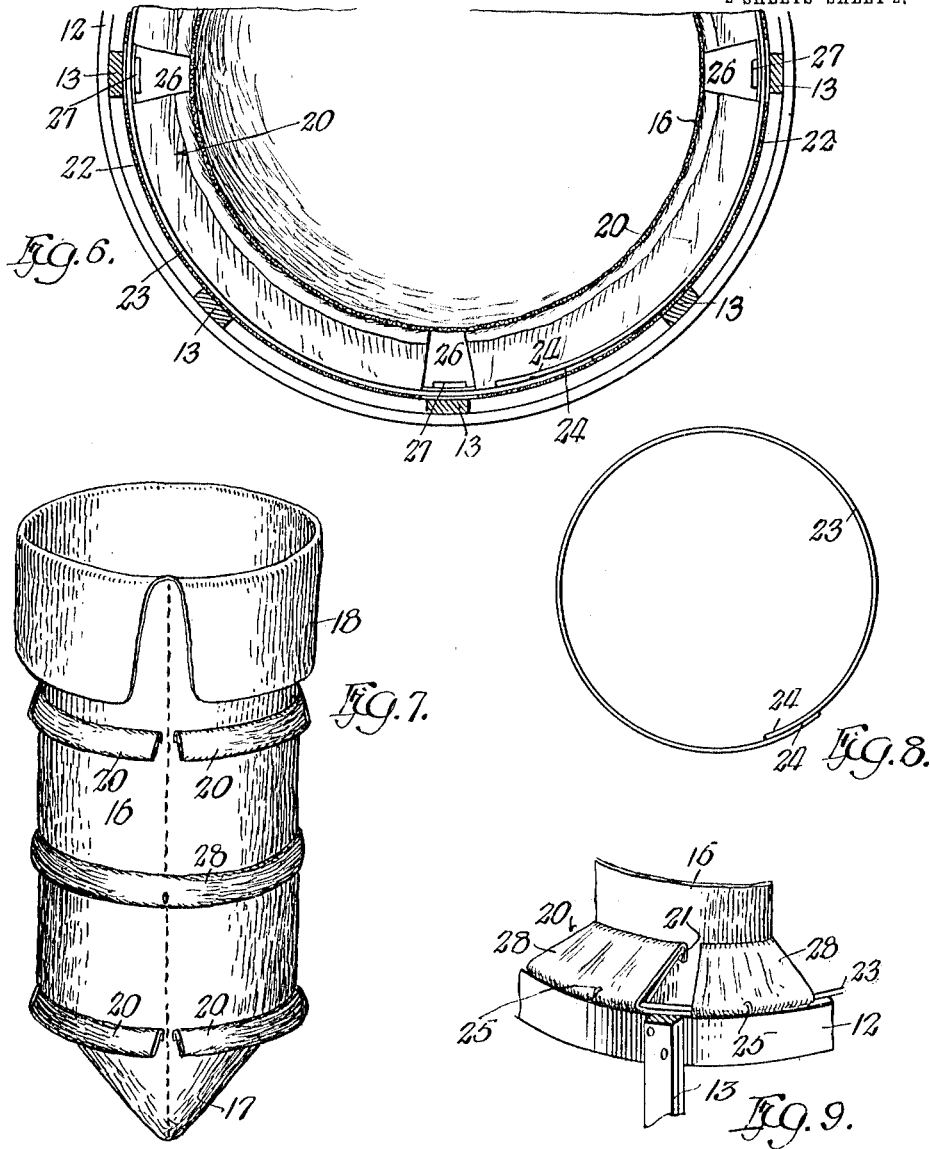
Witnesses:
T. N. Alfreds
H. R. Wilkins
Inventor
Thomas P. Foley
by Brown & Phillips Attys

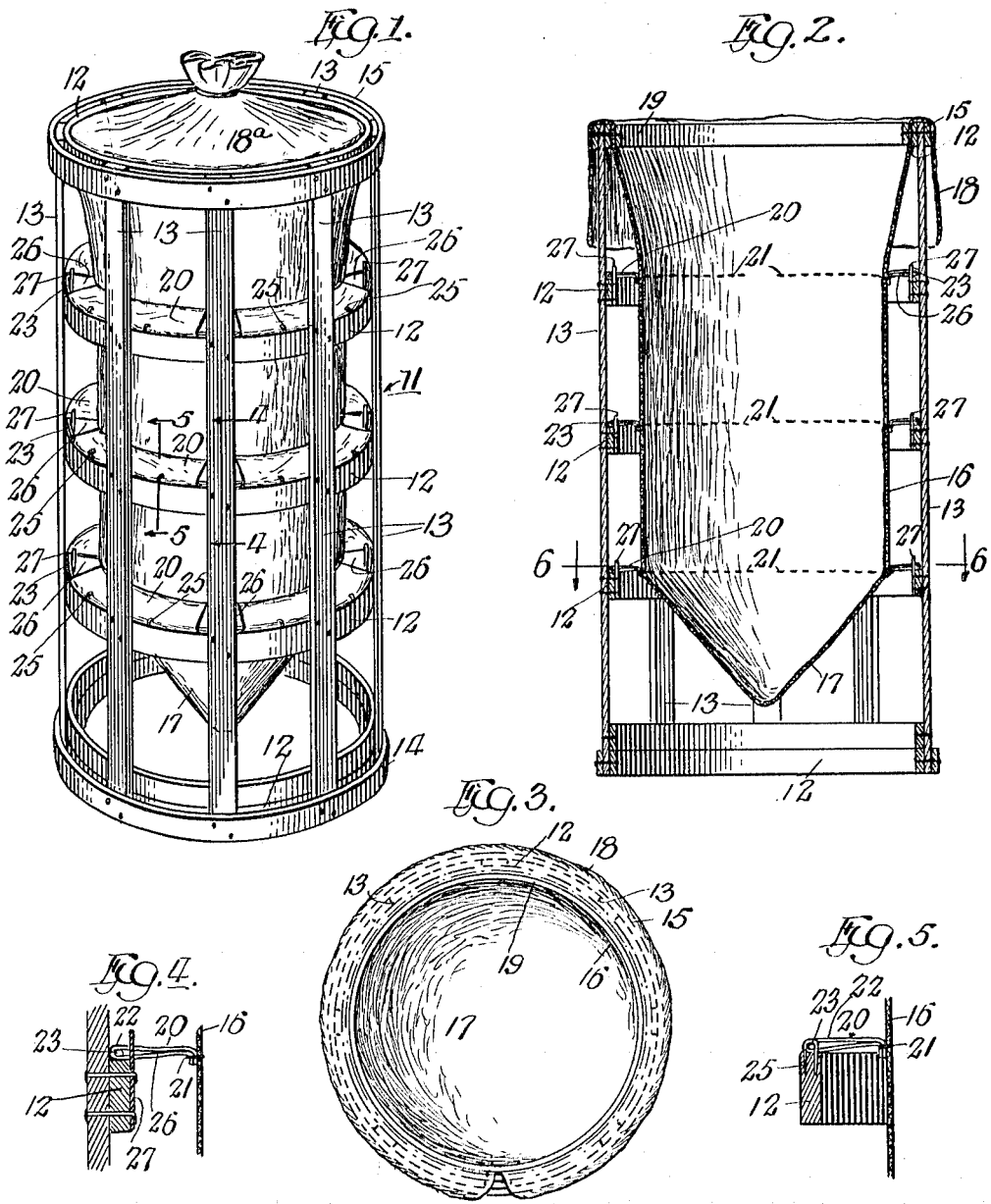

UNITED STATES PATENT OFFICE.

THOMAS P. FOLEY, OF CHICAGO, ILLINOIS.

SHIPPING-CRATE FOR BANANAS.

1,116,259.  Specification of Letters Patent.  Patented Nov. 3, 1914.

Application filed January 15, 1914. Serial No. 812,191.

*To all whom it may concern:*

Be it known that I, THOMAS P. FOLEY, a citizen of the United States, and a resident of Chicago, in the county of Cook and State of Illinois, have invented certain new and useful Improvements in Shipping-Crates for Bananas; and I do hereby declare that the following is a full, clear, and exact description thereof, reference being had to the accompanying drawings, and to the letters of reference marked thereon, which form a part of this specification.

This invention relates to improvements in crates for shipping bananas, and consists of the matters hereinafter described and more particularly pointed out in the appended claims.

The improved crate is of that type which is adapted to receive and inclose a single bunch of bananas and consists of an outer frame comprising the crate proper, and an inner bag which supports the bunch of bananas within the crate and which constitutes the envelop for inclosing the same.

The object of the invention is to provide improved means for supporting the bag within the crate in such manner that when the crate is thrown on its side, the bag will not be brought into contact with the crate frame, under the action of gravity, to bruise and spoil the bananas. The advantages of my improved construction will appear as I proceed with my specification.

In the drawings: Figure 1 is a perspective view of my improved banana crate showing it as it appears when the bag is closed. Fig. 2 is a view representing a vertical central section through the crate with the upper part of the bag opened out in the condition that it is when ready to receive a bunch of bananas. Fig. 3 is a view representing a top plan of the crate as it appears when looking down from above Fig. 2. Fig. 4 is a view representing a partial vertical section on an enlarged scale in a plane indicated by the line 4—4 of Fig. 1. Fig. 5 is a view representing a partial vertical section on an enlarged scale in a plane indicated by the line 5—5 of Fig. 1. Fig. 6 is a view representing a transverse section through Fig. 2 in a plane indicated by the line 6—6 of Fig. 2. Fig. 7 is a view in perspective of the bag as the same appears when removed from the crate proper. Fig. 8 is a plan view of a wire hoop used in suspending the bag within the crate proper. Fig. 9 and 10 are detail perspective views illustrating the manner of suspending the bag within the crate proper.

Referring now to that embodiment of my invention illustrated in the drawings, 11 indicates the crate proper which is preferably cylindrical in form and is made up of a plurality of vertically spaced hoops 12 and of annularly spaced, longitudinally extending strips 13 attached to the outside of said hoops. The hoops and strips are made preferably of wood and are secured together by nails which are driven in from the outside and have their inner ends turned or bent over in a familiar manner to prevent their withdrawal. As shown, the base of the crate is reinforced by an outer hoop 14 placed in the plane of the inner bottom hoop 12 and by an additional inner hoop placed immediately above and resting upon the bottom inner hoop 12. The top of the crate is also preferably reinforced by means of an outer hoop 15.

16 indicates the bag that is intended to contain the bananas. This is preferably made of burlap or of some equivalent coarse, strong, fibrous material. The bag is substantially cylindrical in form and is provided with a conical closed bottom 17. The bag is made deeper than the crate in order to provide a flap extension 18 which may be drawn together to form a top closure 18ª, as indicated in Fig. 1, and which is slit so that it may be folded down outside the upper end of the crate, as shown in Figs. 2 and 3, when the bunch of bananas is to be packed into the crate. The bag 16 is suspended from the top of the crate by means of an auxiliary hoop 19 which is placed within the bag in such manner as to embrace the bag wall between it and the inner top hoop 12. The outer top hoop 15, the inner top hoop 12, the bag wall, and the auxiliary inner hoop 19 are all secured together by wire nails in a familiar manner.

In order to retain the bag with its vertical side walls in spaced relation with the members of the crate so as to provide a space about the bag within the crate and prevent the bag from being jarred against the crate by the weight of the bananas, the following construction is provided: In the planes or zones of the top edges of each of the intermediate hoops 12, there are attached to the outer surface of the bag a plurality of horizontal, arcual, flexible flaps 20 arranged in a circular row, girdle like about the bag. These flaps are made of just sufficient radial width to bridge the space between the crate and the cylindrical bag wall when the bag is in the position which it is designed to occupy. Said flaps are made preferably of canvas or of some similar material that is capable of little or no stretching, and, as shown, are made of strips doubled over and folded upon themselves so that the flap is of double thickness. The free edges of the strip are sewed to the bag, as indicated at 21, while the looped edges 22 are placed next adjacent to the crate.

A wire hoop 23, consisting of a length of wire bent into hoop form and having overlapping ends 24, 24 (see Figs. 6 and 8) is passed through the looped edges of the several flaps 20, as shown more clearly in Figs. 9 and 10. This wire hoop acts to spread the flaps. The said flaps are fastened to the crate by means of staples 25 (see Fig. 5) which are driven into the top edge of the wooden hoop 12 in the plane or zone of which the girdle of flaps is located. The flaps 20 of each row of flaps are equi-spaced apart in an annular direction to leave spaces 26 between them, and these spaces are so arranged with reference to the longitudinal strips of the crate that the spaces will come opposite alternate strips 13. At these spaces, as is shown in detail in Fig. 10, there are preferably attached to the inner face of the associated hoop 12 short upright plates 27 which are fixed in place by means of the same nails that attach the longitudinal strips to the hoops. Said plates 27 rise a short distance above the upper edge of the hoop 12 and act to prevent the wire hoop 23 from being displaced from the top of the hoop 12. If desired, the flaps 20 of a row may be made integral so as to form a continuous, circularly extending flap 28, as illustrated in the case of the middle flap row in Fig. 7. In such case, the plates 27 are omitted. It is preferable, however, to have the flaps in the rows above and below such an integral flap 28 constructed as originally described,—that is to say, arranged in a row comprising a plurality of annularly spaced flaps.

It will be manifest that the construction described will provide lateral support for the bag in a plurality of planes or zones intermediate its top and bottom so that in said planes or zones the bag is held in such proper spaced relation within the crate as to prevent it from being forced by the weight of its contents into contact with the crate when the crate is inclined or laid on its side. While three of said zones of lateral support are shown in the drawings, this number may be varied according to the height of the crate.

I claim as my invention:

1. In a shipping device, comprising a crate and a bag suspended within said crate, means providing lateral support for said bag to hold it in spaced relation within the crate, comprising strips doubled over and folded upon themselves to form flexible flaps of a double thickness attached at their inner free edges to the bag and extending girdle-like about said bag, said flaps being provided with a loop at their outer edges, an expanding member extending through said loops, and means for attaching said expanding member to the crate.

2. In a shipping device, comprising a crate and a bag suspended within the said crate, means providing lateral support for said bag to hold it in spaced relation within the crate, comprising a plurality of rows of horizontal, flexible flaps, each row of flaps extending girdle-like about the bag and being attached to the bag, the flaps of each row being spaced apart in an arcuate direction, means for attaching the outer edges of the flaps to the crate in the plane of said flaps, including an expanding hoop, and means attached to the crate and interposed intermediate the flaps of the several rows adapted to retain said hoop in position.

3. In a shipping device, comprising a crate and a bag suspended within said crate, means providing lateral support for said bag to hold it in spaced relation within the crate, comprising a plurality of rows of horizontal flexible flaps, each row of flaps extending girdle-like about the bag and being attached to the bag, the flaps of each row being spaced apart in an arcuate direction, means for attaching the outer edges of the flaps to the crate in the plane of said flaps, including an expanding hoop and means interposed intermediate the flaps of the several rows adapted to retain said hoop in position, said means comprising plates attached to the said crate and extending into a plane beyond that of said expanding hoop to confine said hoop in proper position relative to said crate.

In testimony, that I, claim the foregoing as my invention I affix my signature in the presence of two witnesses, this 9th day of January A. D. 1914.

THOMAS P. FOLEY.

Witnesses:
T. H. ALFREDS,
CLARENCE E. MEHLHOPE.